United States Patent
Wyper et al.

(10) Patent No.: US 8,141,577 B2
(45) Date of Patent: Mar. 27, 2012

(54) LIQUID FILLED PRESSURE/VACUUM VALVE FOR PETROLEUM UNDERGROUND STORAGE TANKS

(75) Inventors: Thompson W. Wyper, Stonington, CT (US); Milton Daniel McGill, La Habra Heights, CA (US)

(73) Assignee: Franklin Fueling Systems, Inc., Madison, WI (US)

( * ) Notice: Subject to any disclaimer, the term of this patent is extended or adjusted under 35 U.S.C. 154(b) by 521 days.

(21) Appl. No.: 11/881,676

(22) Filed: Jul. 27, 2007

(65) Prior Publication Data

US 2008/0173371 A1    Jul. 24, 2008

Related U.S. Application Data

(60) Provisional application No. 60/835,102, filed on Aug. 1, 2006.

(51) Int. Cl.
*F16K 13/10* (2006.01)
(52) U.S. Cl. .................................. 137/254; 137/493.8
(58) Field of Classification Search ............... 137/251.1, 137/493, 493.8, 253, 254
See application file for complete search history.

(56) References Cited

U.S. PATENT DOCUMENTS

| | | | | |
|---|---|---|---|---|
| 1,234,604 A * | 7/1917 | Honeywell | ............ | 180/19.1 |
| 1,243,604 A * | 10/1917 | Honeywell | ............ | 137/252 |
| 1,651,051 A * | 11/1927 | Wiggins | ............ | 137/251.1 |
| 1,727,785 A * | 9/1929 | Roth | ............ | 137/248 |
| 2,252,174 A * | 8/1941 | Glab | ............ | 137/493 |
| 2,917,071 A * | 12/1959 | Crumley et al. | ............ | 137/251.1 |
| 3,831,619 A * | 8/1974 | Schmidt | ............ | 137/206 |
| 3,983,913 A | 10/1976 | Bower | | |
| 5,072,912 A | 12/1991 | LeBlanc et al. | | |
| 5,755,854 A | 5/1998 | Nanaji | | |
| 5,843,212 A | 12/1998 | Nanaji | | |
| 6,644,360 B1 | 11/2003 | Sobota et al. | | |
| 6,763,856 B2 | 7/2004 | Healy | | |
| 6,802,332 B1 * | 10/2004 | Stuart | ............ | 137/68.12 |
| 6,836,732 B2 | 12/2004 | Tiberi | | |
| 7,011,119 B2 | 3/2006 | Fink, Jr. | | |
| 2002/0043283 A1 * | 4/2002 | Bouwkamp | ............ | 137/251.1 |

* cited by examiner

*Primary Examiner* — Stephen M Hepperle
*Assistant Examiner* — William McCalister
(74) *Attorney, Agent, or Firm* — Faegre Baker Daniels LLP

(57) ABSTRACT

A liquid filled pressure/vacuum valve for underground storage tanks has a body having an inlet coupled to the UST and an outlet coupled to atmosphere. The valve has a suction zone disposed in the body and fluidly coupled to the inlet. The valve has a pressure zone disposed in the body and fluidly coupled to the outlet, with the suction zone in fluid communication with the pressure zone. The valve has a separator disposed in fluid communication with the outlet and the pressure zone, and a fluid that flows between the suction zone and pressure zone. The flow of fluid is determined by an increased force due to a pressure differential between the suction zone and pressure zone.

34 Claims, 14 Drawing Sheets

LIQUID FILLED PRESSURE/VACUUM VALVE FOR PETROLEUM UNDERGROUND STORAGE TANKS

PRIORITY CLAIM

This Application claims priority to Provisional Patent Application No. 60/835,102, entitled "Liquid Filled Vent Trap for Petroleum Underground Storage Tanks", filed on Jul. 31, 2006.

BACKGROUND

During the fueling of vehicles, liquid gasoline is delivered into the vehicle fuel tank, and a mixture of gasoline vapor and air is displaced from the vehicle fuel tank. To minimize release of gasoline vapors into the atmosphere, gasoline dispenser nozzles are typically equipped with vapor recovery vacuum systems to collect the displaced gasoline vapor and air, and deliver it back into the ullage of the underground storage tank (UST). The ullage is the amount or volume by which the UST is short of being full of liquid. Preferably, a 1-to-1 ratio balance is sought between the volume of liquid gasoline drawn from the UST to the volume of gasoline vapor returned into the ullage by the vapor recovery system. This balance is difficult to achieve; resulting in air or excess amounts of gasoline vapor being introduced into the UST. This excess vapor will then be discharged through the UST pressure/vacuum (PV) valve (e.g., vent).

Ideally, the use of a PV valve on the UST vent prevents vapors from escaping into the atmosphere, while also preventing fresh air from entering into the UST during normal operation. Typically, the differential operational pressure settings commonly used on PV valves for gasoline storage are 8 inches of water column (WC) vacuum together with 3 inches of WC pressure in the UST. For example, when fueling a vehicle, the removal of gasoline from the UST causes the vapor space pressure to decrease to −8.0 inches WC, thus causing the UST PV valve to open, drawing fresh air into the UST.

Later, when fueling activity slows down in the evening, the large quantity of air previously drawn into the UST will promote evaporation of liquid gasoline into the air in the ullage. As the enclosed system of gas and liquid moves toward vapor pressure equilibrium, the hydrocarbon concentration in the ullage reaches a balance with the volume of liquid gasoline in the UST. This tendency toward equilibrium of gasoline liquid and vapor will cause the pressure in the UST to rise, potentially to a positive pressure of +3.0 inches W.C., which will cause the PV valve to open, releasing gasoline vapors into the environment.

Current PV valve designs typically consist of two weighted discs suspended by springs. In this design, the area of the disc exposed to the differential pressure from the UST and the spring tension are used to determine the set points of the PV valve. One disc assembly is used for pressure, the other for vacuum. Leakage through the PV valve is minimized when the differential pressure is within the PV valve operational settings (i.e., 8 inches of WC vacuum together with 3 inches of WC pressure).

Periodic testing of PV valves at fueling facilities has shown that a high number of PV valves fail to operate within the required regulatory and design parameters. The most common cause of this failure occurs when the seal fails to seat properly, thus allowing vapors to be released from, or air to enter into, the UST. On other occasions, the PV valves will fail to open at the operational settings for various reasons.

What is needed in the art is a specially designed valve that will prevent the UST ullage vapors from escaping to the atmosphere while still maintaining the proper operational differential pressure settings.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. Its sole purpose is to present some concepts of the present disclosure in a simplified form as a prelude to the more detailed description that is presented herein.

The disclosure is directed toward a liquid filled pressure/vacuum valve for underground storage tanks comprising a body having an inlet coupled to the underground storage tank and an outlet coupled to atmosphere, and a suction zone disposed in the body and fluidly coupled to the inlet. The valve also comprises a pressure zone disposed in the body and fluidly coupled to the outlet. The pressure zone is in fluid communication with the suction zone. The valve also comprises a separator disposed in fluid communication with the outlet and the pressure zone, and a fluid disposed in the body that is configured to flow between the suction zone and the pressure zone. The flow of fluid is determined by an increased force due to a pressure differential between the suction zone and the pressure zone.

The disclosure is also directed toward a liquid filled pressure/vacuum valve for underground storage tanks comprising a body having an inlet coupled to the underground storage tank and an outlet coupled to atmosphere, and a suction zone disposed in the body and fluidly coupled to the inlet. The suction zone having a first wide flow passage fluidly coupled to a first narrow flow passage. The valve also comprises a pressure zone disposed in the body and fluidly coupled to the outlet. The pressure zone has a second wide flow passage fluidly coupled to a second narrow passage, such that the second narrow passage is in fluid communication with the first narrow flow passage. The valve also comprises a separator disposed in fluid communication with the outlet and the second wide flow passage, and a fluid disposed in the body that is configured to flow between the suction zone and the pressure zone. The flow of fluid is determined by an increased force due to a pressure differential between the suction zone and the pressure zone.

The disclosure is also directed toward a liquid filled pressure/vacuum valve for underground storage tanks. The valve comprises a body having an inlet coupled to the underground storage tank and an outlet coupled to atmosphere. The body has an interior opposite and exterior and a top opposite a bottom. The valve comprises a first baffle coupled to the body at a position above the inlet, such that the first baffle is configured to create a first wide flow passage and a first narrow flow passage. The valve also comprises a second flow direction shield physically coupled to the body at a position below the inlet, wherein the second flow direction shield defines a portion of the first narrow flow passage. The valve also comprises a second baffle physically coupled to the bottom of the body, such that the second baffle is configured to create a second wide flow passage and a second narrow flow passage, wherein the second narrow passage is defined by the first baffle and the second baffle. The valve also comprises a first flow direction shield coupled to the body at a position above the first baffle, such that the first flow direction shield defines a portion of the second narrow flow passage. The valve also comprises a fluid disposed in the bottom of the body, such that the fluid is configured to flow between the first wide flow passage, the first narrow flow passage, the second wide flow passage, and the second narrow flow passage. The flow of fluid is determined by an increased force due to a pressure differential between the first wide flow passage and the first narrow flow passage and the second wide flow passage and the second narrow flow passage. The valve also comprises a separator coupled to the body proximate the outlet, wherein the separator is configured to prevent escape of the fluid to the atmosphere and to return the fluid to the second wide flow passage.

The disclosure is also directed toward a liquid filled pressure/vacuum valve for underground storage tanks. The valve comprises a suction zone having an inlet fluidly coupled to the underground storage tank, wherein the suction zone chamber includes the inlet, an upper chamber and a suction zone chamber, such that the upper chamber is in fluid communication with the suction zone chamber. The valve also comprises a pressure zone having an outlet fluidly coupled to atmosphere and including the outlet, a lower chamber, and a pressure zone chamber, such that the lower chamber is in fluid communication with the pressure zone chamber, and the pressure zone chamber is in fluid communication with the suction zone chamber. The valve also comprises a fluid disposed in and configured to flow between the suction zone and the pressure zone, such that the flow of fluid is determined by an increased force due to a pressure differential between the suction zone and the pressure zone.

BRIEF DESCRIPTION OF THE FIGURES

Referring now to the figures, wherein like elements are numbered alike.

DETAILED DESCRIPTION

Persons of ordinary skill in the art will realize that the following disclosure is illustrative only and not in any way limiting. Other embodiments of the disclosure will readily suggest themselves to such skilled persons having the benefit of this disclosure.

The present disclosure presents several embodiments of a pressure/vacuum valve, containing a liquid media, utilized to seal underground storage tank (UST) ullage vapors from the atmosphere, while still maintaining the pressure of the UST within the proper operational differential pressure settings. In circumstances when the differential operational pressure settings have been exceeded, air or vapor will bubble through the liquid media, releasing to the atmosphere or UST respectively as in conventional PV valves, until the pressure is back within the proper differential operational pressure settings.

As indicated above, the differential operational pressure settings for conventional PV valves on USTs are 8 inches of water column (WC) vacuum together with 3 inches of WC pressure. The present disclosure provides a liquid filled pressure/vacuum valve that is highly efficient at maintaining the differential operational pressure settings.

Figure 1:
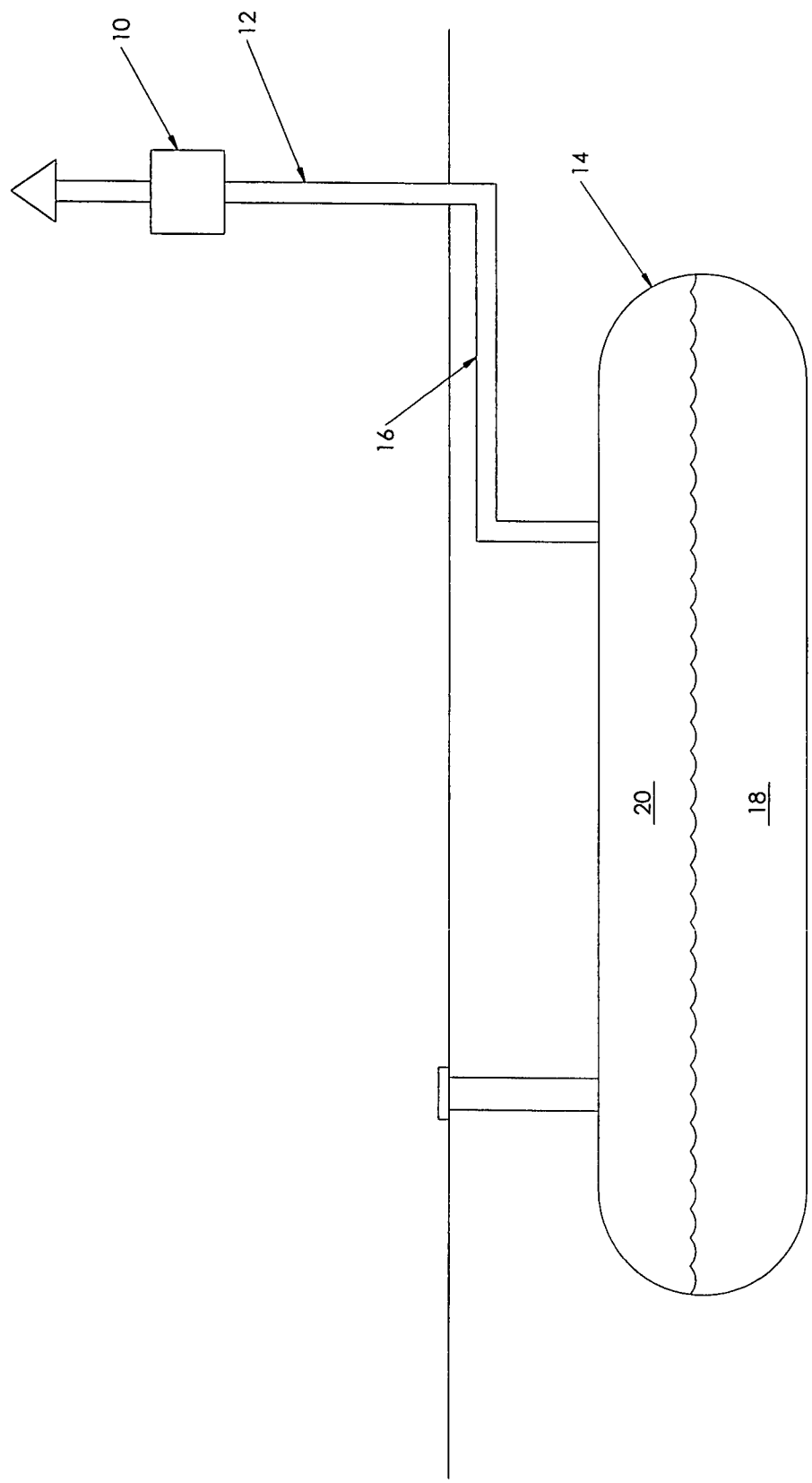
FIG. 1 is a schematic of a liquid filled pressure/vacuum valve installed within an underground storage tank system.

Referring to FIG. 1, a liquid filled pressure/vacuum valve 10 is illustrated being coupled to a vent pipe 12 of a UST 14. Underground piping 16 from the UST 14 is coupled to the vent pipe 12 located aboveground near the UST 14. In this embodiment, the UST 14 contains a volatile fuel product 18, such as gasoline. With the removal of the fuel product 18 from the UST 14, an ullage (or vapor) space 20 is present within the UST 14.

Figure 2:
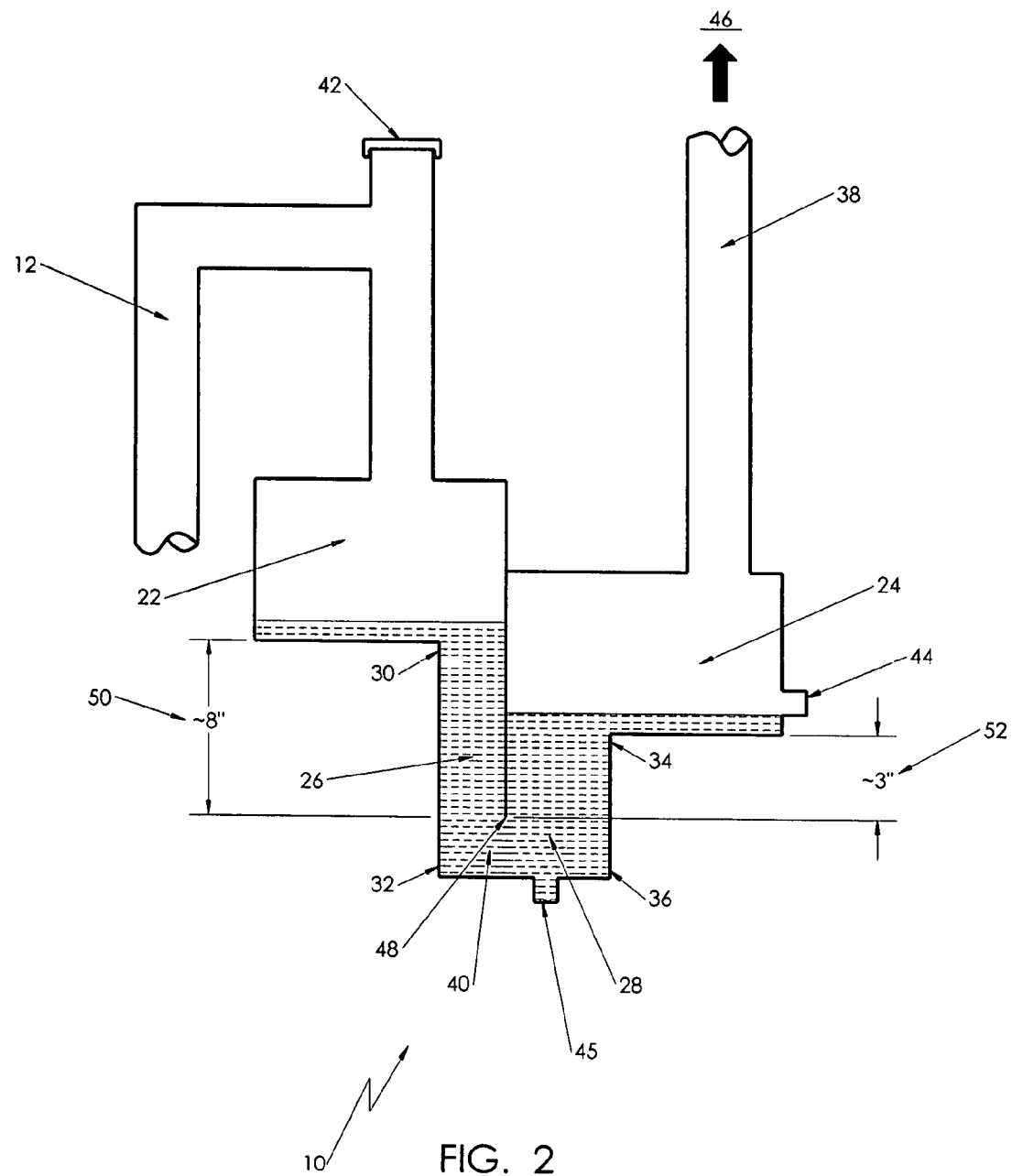
FIG. 2 is a cross sectional side view of an exemplary embodiment of the liquid filled pressure/vacuum valve.

Referring now to FIG. 2, a first embodiment of the liquid filled pressure/vacuum valve 10 is illustrated. The liquid filled pressure/vacuum valve 10 comprises an upper chamber 22 and a lower chamber 24. Below and fluidly coupled to the upper chamber 22 and lower chamber 24 are a suction (or vacuum) zone chamber 26, having an upper end 30 and a lower end 32, and a pressure zone chamber 28, having an upper end 34 and a lower end 36, respectively. These two chambers 26, 28 are fluidly coupled to each another at their lower ends 32, 36, respectively, near connection point 48. Vent pipe 12 from the UST 14 is fluidly coupled to the upper chamber 22. A secondary vent pipe 38 extends from the liquid filled pressure/vacuum valve 10 and is fluidly coupled to the lower chamber 24.

A fluid 40 is disposed in the liquid filled pressure/vacuum valve 10, such that the fluid 40 is distributed between the upper chamber 22, the suction zone chamber 26, the lower chamber 24, and the pressure zone chamber 28 depending on the differential pressure state of the system. The fluid 40 levels can be monitored and increased using a test plug port 42 and opening a fill port 44. The fluid 40 can be any fluid that is suitable for venting out air when a particular level of air pressure is applied. The fluid must have a low vapor pressure to prevent evaporation and be hydrophilic. Preferred fluids 40 are propylene glycol or ethylene glycol. The fluid must also have a low freezing point. The levels of fluid 40 can be increased by engaging the test plug port 42 and opening a fill port 44. The fluid 40 can then be poured into the liquid filled pressure/vacuum valve 10 through the fill port 44. Likewise, the level of fluid 40 can be decreased by draining the fluid 40 from the liquid filled pressure/vacuum valve 10 through a drain port 45. Other preferred fluid characteristics are fuel phobic, non-reactive, non-foaming and low toxicity. Each of these characteristics contributes to improved performance of the liquid filled pressure/vacuum valve 10, 63. A non-foaming characteristic is particularly important as foam will impede the response time of the system as well as modify the differential pressure settings of the system.

The liquid filled pressure/vacuum valve 10 be any shape that serves to maintain the desired differential points, a preferred shape of the first embodiment is a u-shape. The u-shaped configuration is illustrated in FIG. 2. The upper chamber 22 can be about 6 inches to about 9 inches in length and about 5 inches to about 8 inches in width. The lower chamber 24 can be about 6 inches to about 8 inches in length and about 5 inches to about 9 inches in width. The pressure zone chamber 28 can be about 1.5 inches to about 5 inches in length and about 1.5 inches to about 4 inches in width. The suction zone chamber 26 can be about 2 inches to about 5 inches in length and about 2 inches to about 5 inches in width.

The relative areas of each chamber 26, 28 can be selected to set the differential pressure settings for vacuum and pressure. To reduce the risk that the fluid 40 may be forced out of the pressure/vacuum valve 10 to the atmosphere 46 or into the UST 14 by a vacuum or pressure spike, the chambers 22, 24 are enlarged and fluidly coupled to the chambers 26, 28. The enlarged chambers 22, 24 also allow for a desensitization of the performance of the pressure/vacuum valve relative to the amount of fluid 40 in the liquid filled pressure/vacuum valve 10. The setting of the desired differential points is established by the physical geometry or dimensions of the chambers 22, 24, 26, 28.

Once the fluid 40 is installed in the liquid filled pressure/vacuum valve 10, some of the fluid 40 may evaporate, however any loss will not have a directly proportional impact on the performance due to the enlarged chamber sections 22, 24. Moreover, the enlarged chambers 22, 24 permit a larger volume of fluid 40 to be stored within the liquid filled pressure/vacuum valve 10 without changing the operating pressure settings such that any additional liquid such as water added will not disrupt operation.

The liquid filled pressure/vacuum valve 10 can be comprised of any material that can withstand the pressures applied, structural integrity for mounting and compatible with the fuel products stored in the UST. Preferred materials include stainless steel, aluminum, powder-coated steel, fiberglass reinforced plastic, plastic and the like, and combinations thereof.

In an exemplary embodiment illustrated in FIG. 2, the pressure zone chamber 28 and the suction zone chamber 26 are configured so that operational settings of about 6 inches to about 10 inches WC vacuum, with about 8 inches WC vacuum preferred and about 2.5 inches to about 6 inches WC pressure, with about 3 inches WC pressure preferred are achieved. The pressure zone chamber 28 and the suction zone chamber 26 are configured to be of equal volume but with different cross sectional areas to achieve the required 3 inch and 8 inch chamber evaluations. That is, the height of the pressure zone chamber 28 above the connection point 48 with the suction zone chamber 26 is about 8 inches (see numeral 50) while the height of the suction zone chamber 26 above the connection point 48 is about 3 inches (see numeral 52). Furthermore, as noted above, the upper chamber 22 and the lower chamber 24 comprise larger volumes so that a larger volume of fluid 40 may be stored within the liquid filled pressure/vacuum valve 10 without changing the operational settings. Although the operational settings are described as 8 inches of WC vacuum and 3 inches of WC pressure, any operational settings can be utilized, varying either the WC vacuum or pressure by means of geometric manipulation, as long as the requisite amount of pressure resistance is achieved.

Figure 3:
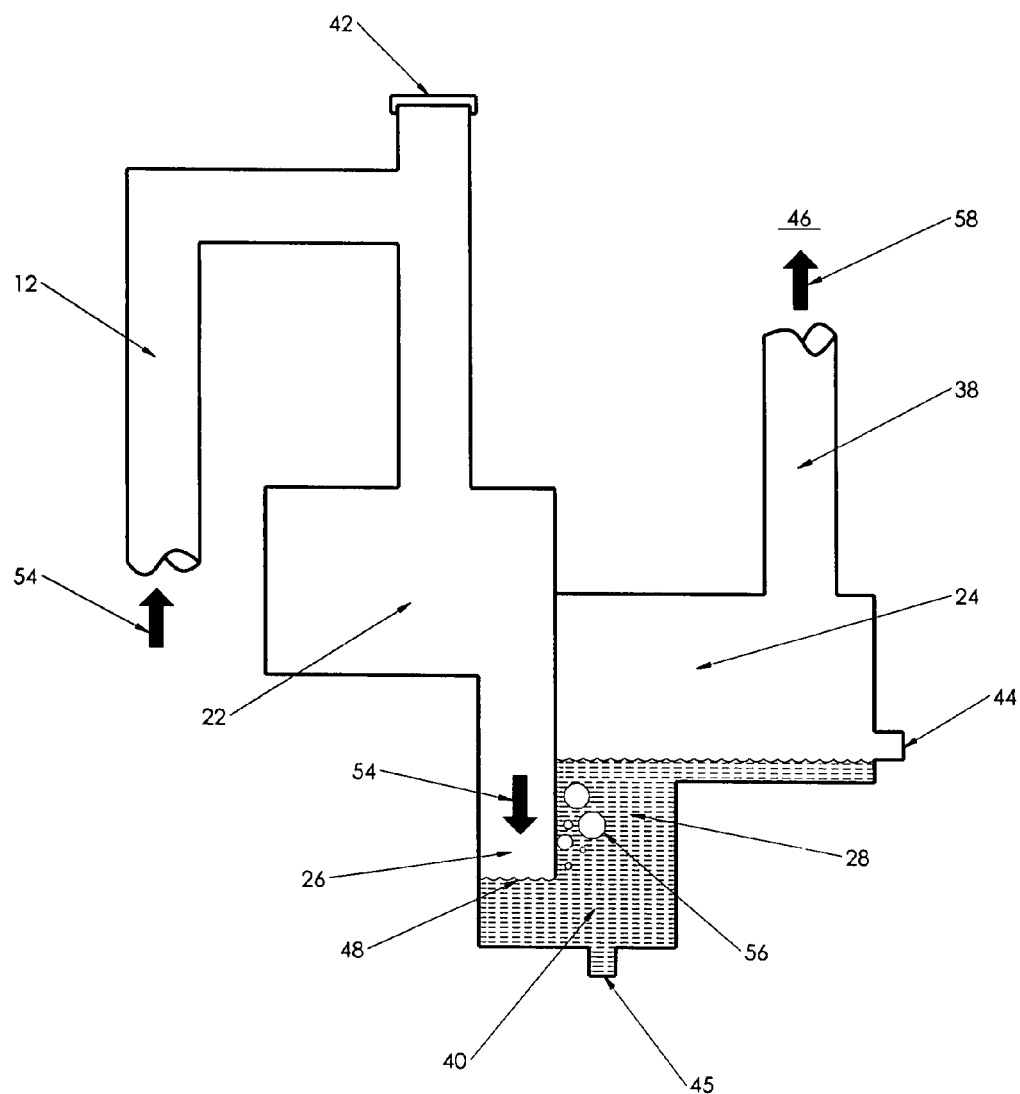
FIG. 3 is a cross sectional side view of the liquid filled pressure/vacuum valve of FIG. 2 illustrating a situation where the pressure in the underground storage tank is greater than atmospheric pressure.
Figure 4:
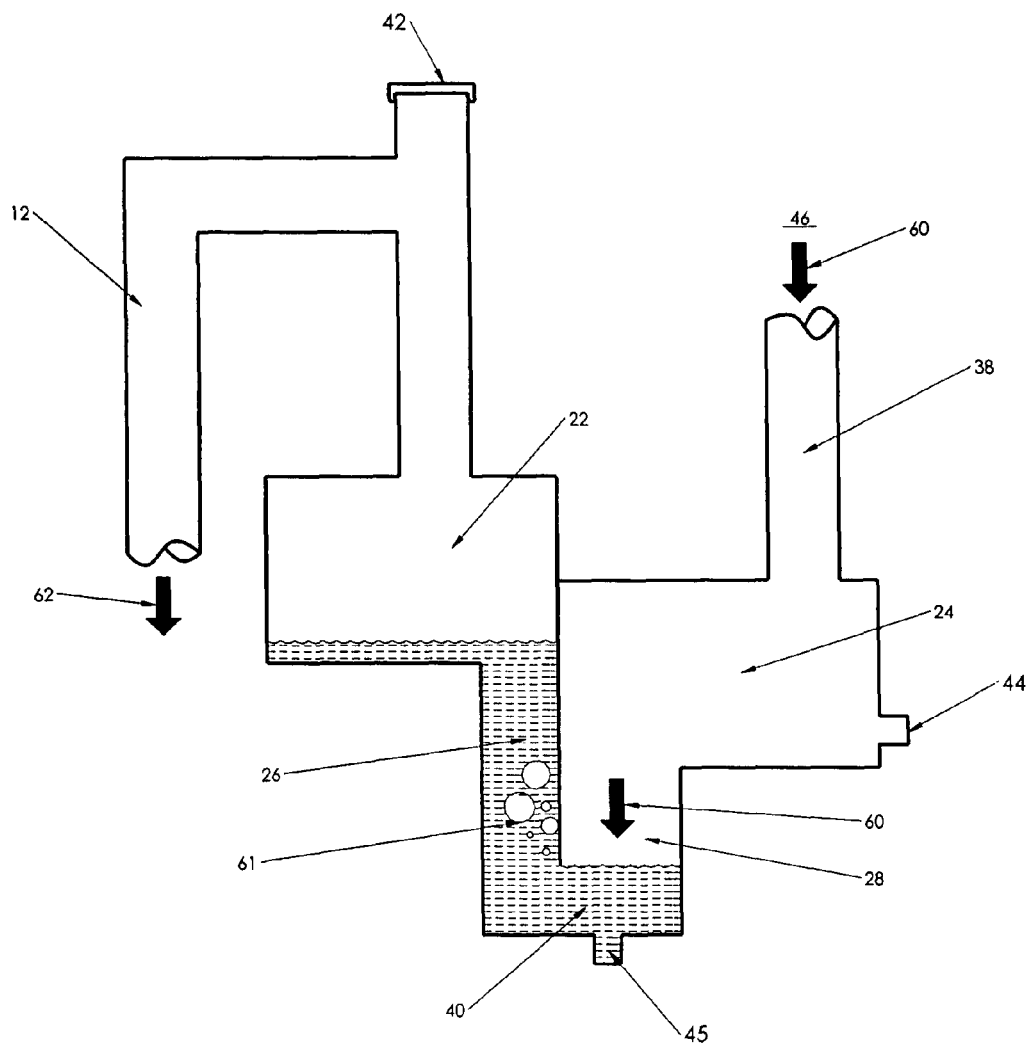
FIG. 4 is a cross sectional side view of the liquid filled pressure/vacuum valve of FIG. 2 illustrating a situation where the atmospheric pressure is greater than the underground storage tank pressure.

The use of the first embodiment of the liquid filled pressure/vacuum valve 10 is illustrated in FIGS. 3 and 4. FIG. 3 is a cross sectional side view of the liquid filled pressure/vacuum valve 10 illustrating a situation where the pressure in the underground storage tank is greater than atmospheric pressure by at least 3 inches WC and FIG. 4 is a cross sectional side view of the liquid filled pressure/vacuum valve 10 illustrating a situation where the atmospheric pressure is greater than the underground storage tank pressure by at least 8 inches WC. The liquid filled pressure/vacuum valve 10 acts as a regulator of air flow between the atmosphere 46 and the UST 14. When the pressure within the UST 14 is greater than the atmospheric pressure by at least 3 inches WC (illustrated by arrow 54), the increased force of this pressure differential is directed onto fluid 40 in the suction zone chamber 26, as illustrated in FIG. 3. When this downward force acting on the suction zone chamber 26 is sufficiently strong, the fluid 40 in the suction zone chamber 26 is forced downward towards the connection point 48 with the pressure zone chamber 28. When the fluid 40 in the suction zone chamber 26 reaches the vacuum limit, the fluid 40 is forced below the connection point 48; ullage vapor 56 begins to bubble through the fluid 40 that has been forced into the pressure zone chamber 28. Consequently, the ullage vapor 56 will be forced through the pressure zone chamber 28 and the secondary vent pipe 38, and out into the atmosphere 46 (illustrated by arrow 58).

When the atmospheric pressure is greater than the pressure within the UST 14 by at least 8 inches WC (illustrated by arrow 60), the increased force due to the pressure differential is directed onto fluid 40 in the pressure zone chamber 28, as illustrated in FIG. 4. When this downward force acting on the pressure zone chamber 28 is sufficiently strong, the fluid 40 in the pressure zone chamber 28 is forced downward towards the connection point 48 with the suction zone chamber 26. When the fluid 40 in the pressure zone chamber 28 reaches the vacuum limit, the fluid 40 is forced below the connection point 48 and air 61 begins to bubble through the fluid 40 that has been forced into the suction zone chamber 26. Consequently, the air 61 will be forced through the suction zone chamber 26 and the vent pipe 12, and into the UST 14 (illustrated by arrow 62).

Figure 5:
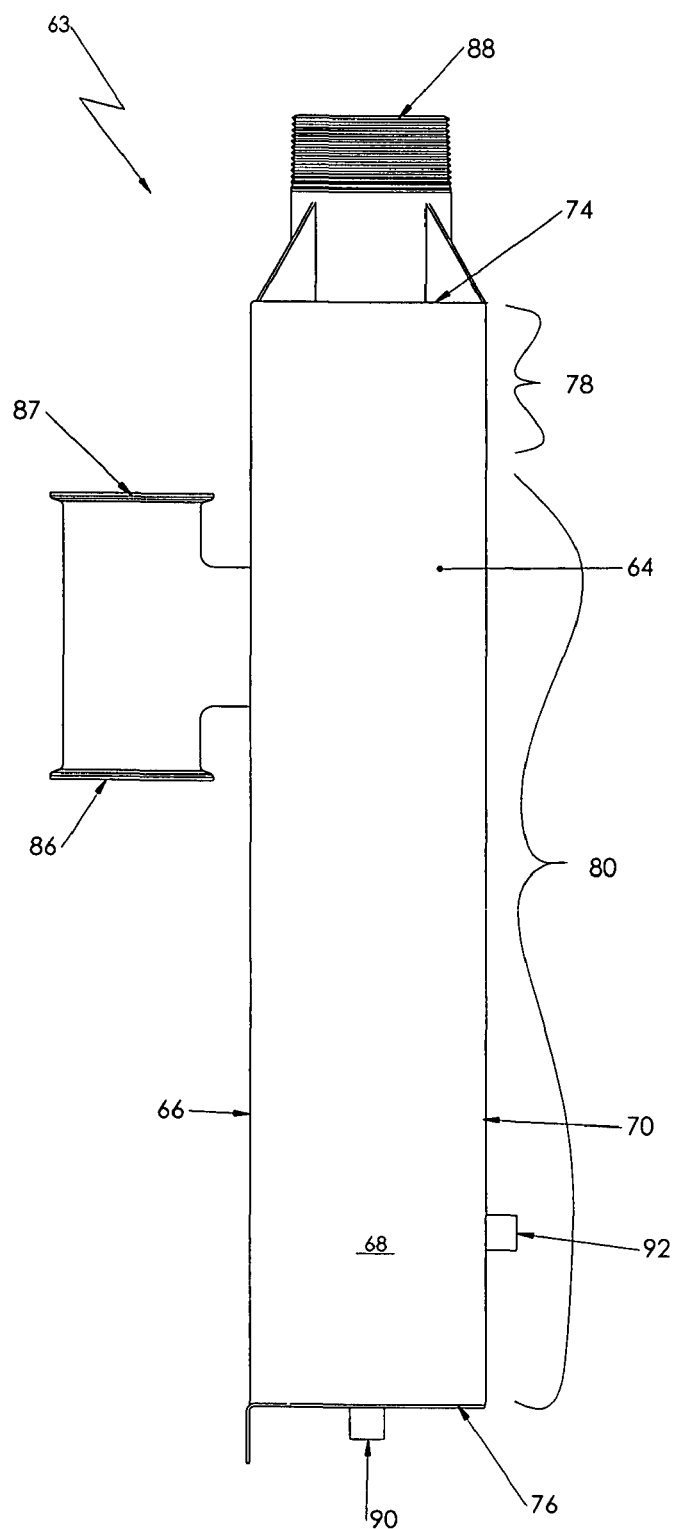
FIG. 5 is a front view of another exemplary embodiment of the liquid filled pressure/vacuum valve.
Figure 6:
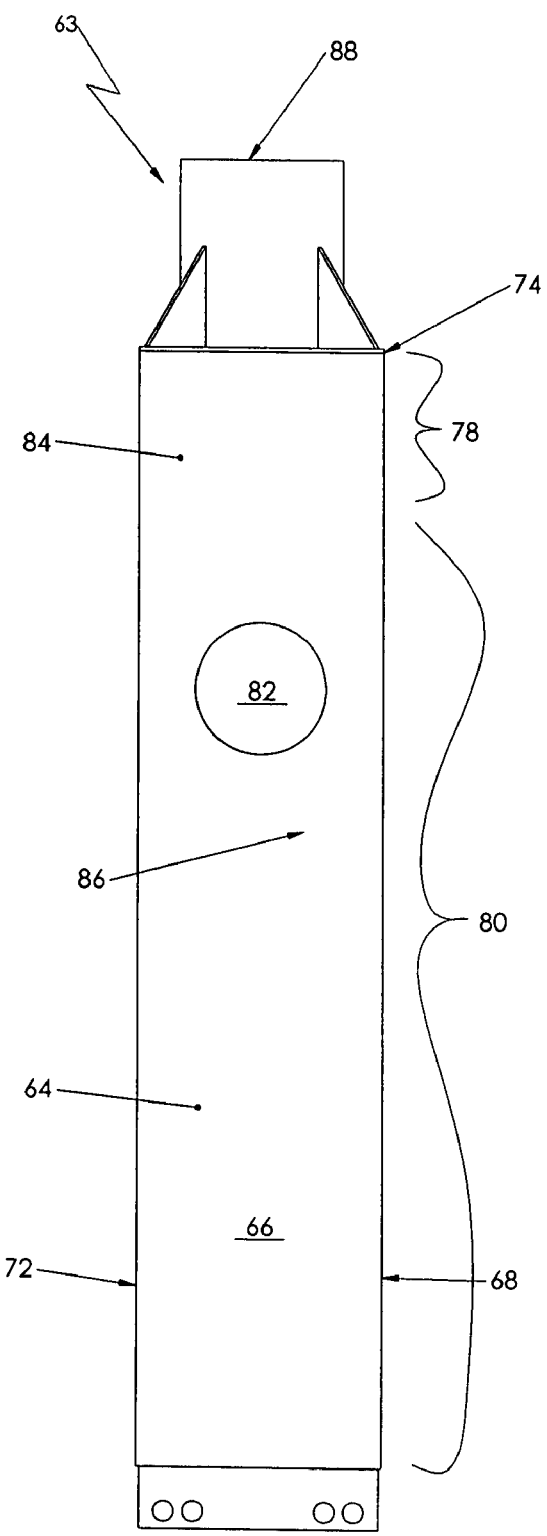
FIG. 6 is a side view of the liquid filled pressure/vacuum valve of FIG. 5.

Referring now to FIGS. 5 and 6, another exemplary embodiment of the liquid filled pressure/vacuum valve 63 is illustrated. FIG. 5 illustrates a front view of the liquid filled pressure/vacuum valve 63 and FIG. 6 illustrates a side view of the liquid filled pressure/vacuum valve 63. The liquid filled pressure/vacuum valve 63 includes a body 64 having a first side 66, a second side 68, a third side 70, and a fourth side 72 with a top 74 opposite a bottom 76. An upper portion 78 is opposite a bottom portion 80. The body 64 has an interior 82 and an exterior 84. An inlet 86 is coupled to the first side 66 and an outlet 88 is coupled to the top 74. The inlet 86 is also fluidly coupled to vent pipe 12 from a UST 14 and the outlet 88 is also fluidly coupled to a vent pipe leading to the atmosphere 46. Adjacent to the inlet 86 is a test plug port 87. A fluid drain port 90 is coupled to the bottom 76 of the body 64. The fluid fill port 92 is disposed on the third side 70 of the body 64. Although one port 92 is illustrated any number is contemplated to achieve various set points as required.

Figure 7:
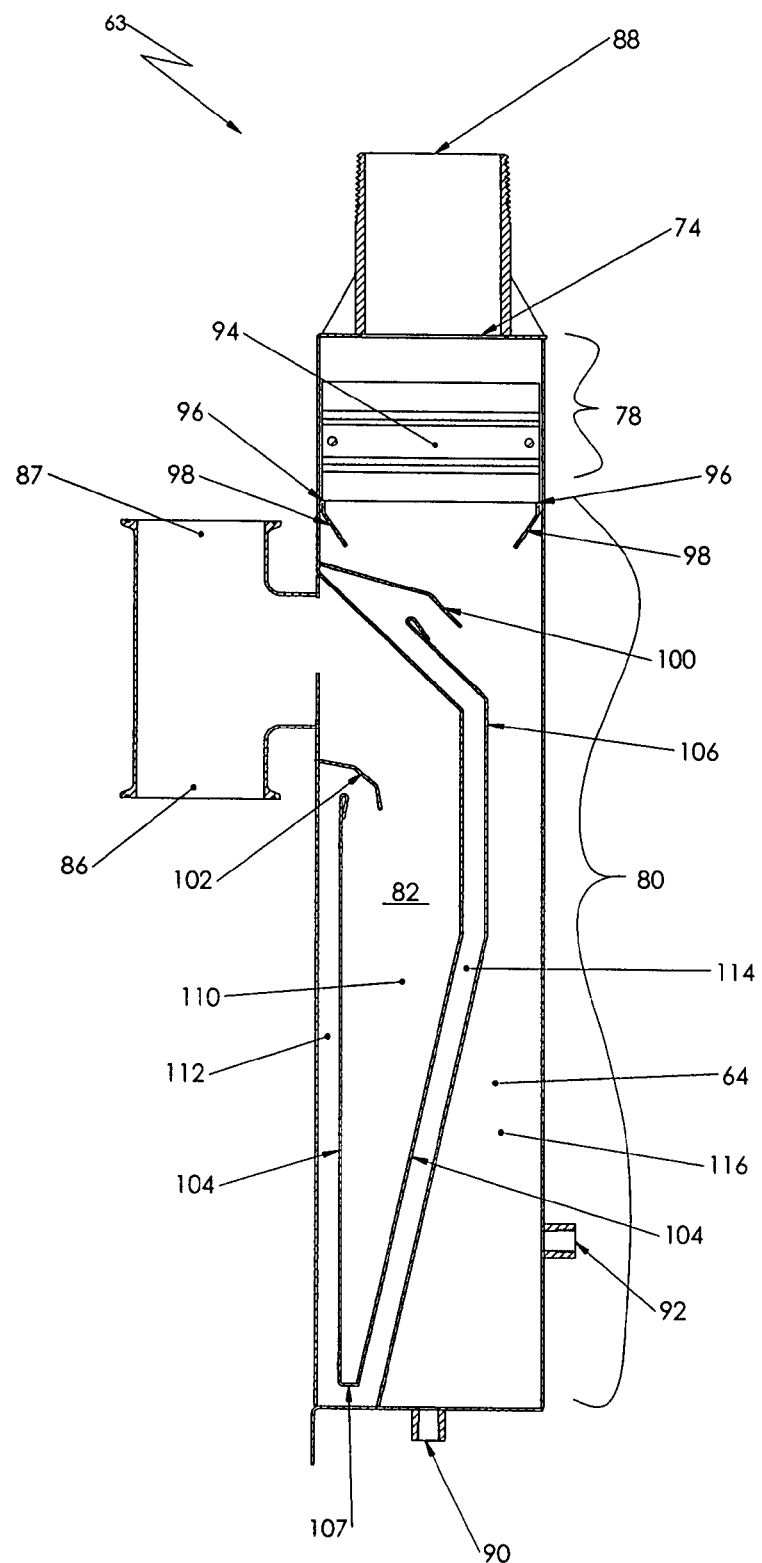
FIG. 7 is a cross sectional front view of the liquid filled pressure/vacuum valve of FIG. 5.
Figure 8:
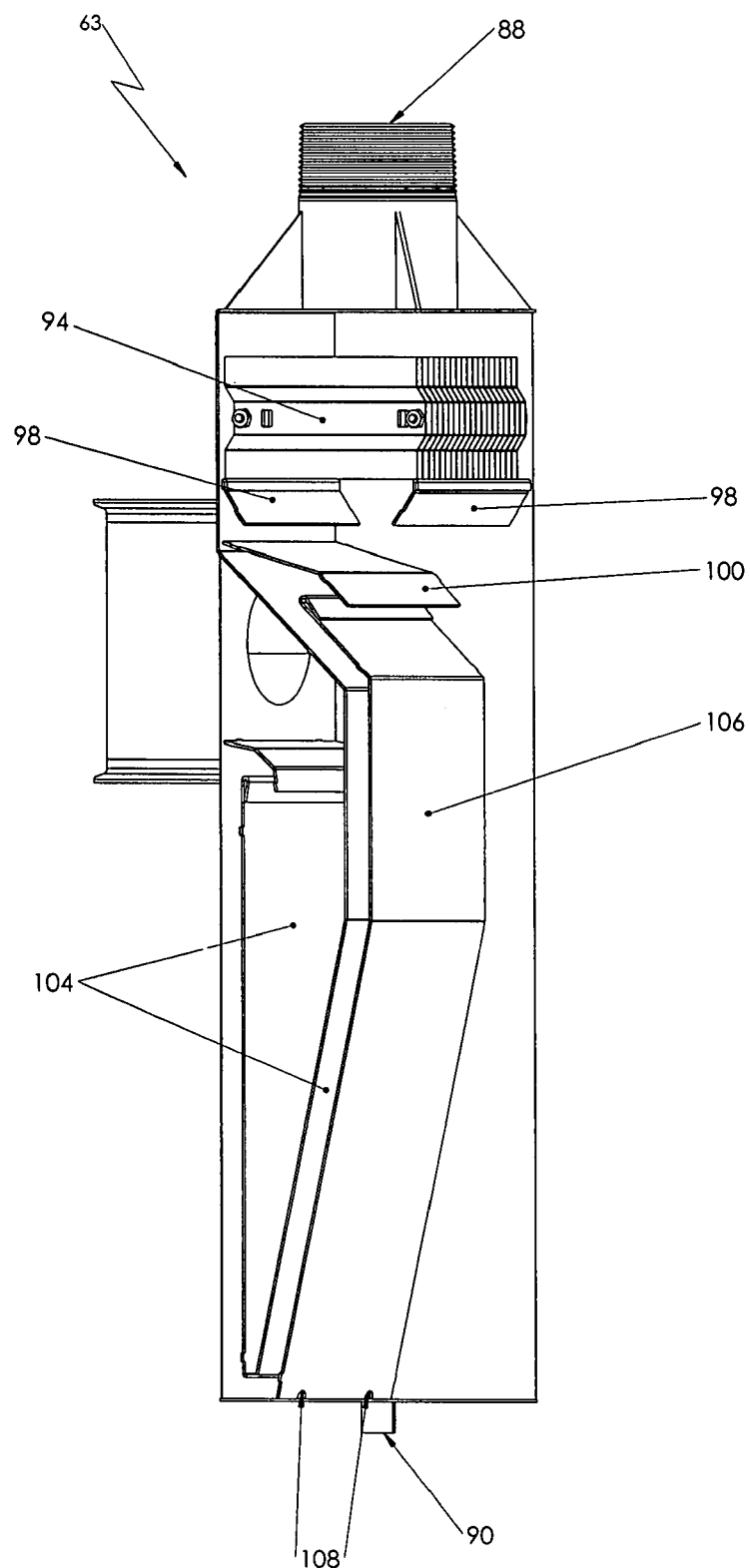
FIG. 8 is a cross sectional perspective view of the liquid filled pressure/vacuum valve of FIG. 5.

A cross section of the interior of the liquid filled pressure/vacuum valve 63 of FIG. 5 is illustrated in FIG. 7, with a perspective view of the interior 82 illustrated in FIG. 8. A separator 94 is coupled to the body 64 in the upper portion 78. Any type of separator 94 can be utilized; however, a chevron plate separator is preferred as illustrated in FIG. 8. Supports 96 are disposed on the interior 82 of the first side 66 and the third side 70 of the body 64 to secure the separator 94 to the body 64, although any number of securing methods is contemplated. Disposed beneath the separator 94 on the interior walls of the first side 66 and the third side 70 are flanges 98. The flanges 98 trap fluid 40 running up the interior walls of the first side 66 and third side 70 and prevent fluid 40 from exiting the liquid filled pressure vacuum valve 63 during high flow events.

A first flow direction shield 100 is coupled to the interior wall of the first side 66 of the body 64 above the inlet 86. The first flow direction shield 100 is about 3 inches to about 5 inches in length and about 4.75 inches to about 5.25 inches in width and extends towards the interior 82 of the body 64 at a downward angle. A second flow direction shield 102 is coupled to the interior 82 of the first side 66 of the body 64 below the inlet 86. The second flow direction shield 102 is about 1.5 inches to about 3 inches in length and about 4.75 inches to about 5.25 inches in width and extends towards the interior 82 of the body 64 at a downward angle. The preferred configurations of the first flow direction shield 100 and the second flow direction shield 102 are illustrated in FIG. 7.

A first baffle 104 is coupled to the interior 82 of the first side 66 of the body 64 between the inlet 86 and the first flow direction shield 100 and extends through several angles towards the bottom 76. About 0.5 inches from the bottom 76, the first baffle 104 angles towards the top 74 of the body 64 and extends towards (about 0.3 inches to about 1.0 inches below) the second flow direction shield 102. The first baffle 104 is about 33 inches to about 36 inches in length and about 5.0 inches to about 5.375 inches in width. Located on the face of the first baffle 104 closest to the bottom 76 is at least one opening 107. A preferred configuration of the first baffle 104 is illustrated in FIG. 7.

A second baffle 106 is coupled to interior 82 of the bottom 76 of the body 64 about 0.3 inches to about 1.0 inches from the first baffle 104. The second baffle 106 extends towards the top 74 at several angles paralleling the path of the first baffle 104. The second baffle 106 extends towards the first flow direction shield 100 ending about 0.3 inches to about 1.0 inches below the first flow direction shield 100. Located proximate the bottom 76, at least one opening 108 is disposed in the second baffle 106. The second baffle 106 is about 17 inches to about 19 inches in length and about 4.75 inches to about 5.125 inches in width. A preferred configuration of the second baffle 106 is illustrated in FIG. 7.

The configuration of the first baffle 104 and the second flow direction shield 102 disposed proximate the inlet 86 (i.e., the UST side of the body 64) is designed to create a first wide flow passage 110 and a first narrow flow passage 112. The first wide flow passage 110 can have varying width from about 0.375 inches to about 4.5 inches. The first narrow flow passage 112 has a more consistent width from about 0.375 inches to about 0.75 inches. The variations in the width of the passages allow for properly controlling flow through the liquid filled pressure/vacuum valve 63. These two passages 110, 112 act as a suction (or vacuum) zone for the body 64.

The configuration of the first baffle 104 to the second baffle 106 and including the first flow direction shield 100 (i.e., the atmospheric side of the body 64) is designed to create a second narrow flow passage 114 and a second wide flow passage 116. The second wide flow passage 116 can have varying width from about 1 inches to about 4 inches. The second narrow flow passage 114 has a more consistent width from about 0.375 inches to about 0.75 inches. The variations in the width of the passages allow for properly controlling flow through the liquid filled pressure vacuum valve 63. These two passages 114, 116 act as a pressure zone for the body 64. The variations in the width of the four flow passages 110, 112, 114, 116 determine the operational differential pressure settings by means of geometrical relationships.

The first narrow flow passage 112 is fluidly coupled to the second narrow flow passage 114, such that any fluid disposed in the two passages 112, 114 can flow between the two passages 112, 114. Likewise opening 108 allows for fluid to flow from the two passages 112, 114 to the second wide passage 116. Opening 107 functions similarly to fluidly couple the passages 112, 114 to the first wide passage 110.

The configuration of the passages 110, 112, 114, 116 by the design of the baffles 104, 106 maintains the desired operational settings of about 6 inches to about 10 inches WC vacuum, with about 8 inches WC vacuum preferred and about 2.5 inches to about 6 inches WC pressure, with about 3 inches WC pressure preferred. These settings are achieved by manipulating the area ratios of the suction zone (i.e., passages 110, 112) and pressure zone (i.e., passages 114, 116). Although the operational settings are described as above, any operational settings can be utilized, varying the WC vacuum or pressure, as long as the requisite amount of pressure resistance is achieved. A range of values for the operational pressure settings can also be achieved by means of adjusting the angle at which the first baffle 104 divides the body 64. By properly choosing this critical angle, a range of differential pressure settings can be met despite fluctuations of fluid volume.

In this exemplary embodiment of the liquid filled pressure/vacuum valve 63, the body 64 can have a height of about 24 inches to about 35 inches, with about 27 inches to about 29 inches preferred. The width of the body 64 can be about 4 inches to about 10 inches, with about 5 inches to about 6 inches preferred. The length of the body 64 can be about 6 inches to about 15 inches, with about 10 inches to about 12 inches preferred. Both the inlet 86 and outlet 88 can be configured to receive 2 inch or 3 inch piping.

The body 64 (including baffles, flow direction shields, separator, etc.) can be comprised of any material that can withstand the pressures applied. Preferred materials include stainless steel, aluminum, powder coated steel, fiberglass reinforced plastic, plastic, and the like, and combinations thereof.

Figure 9:
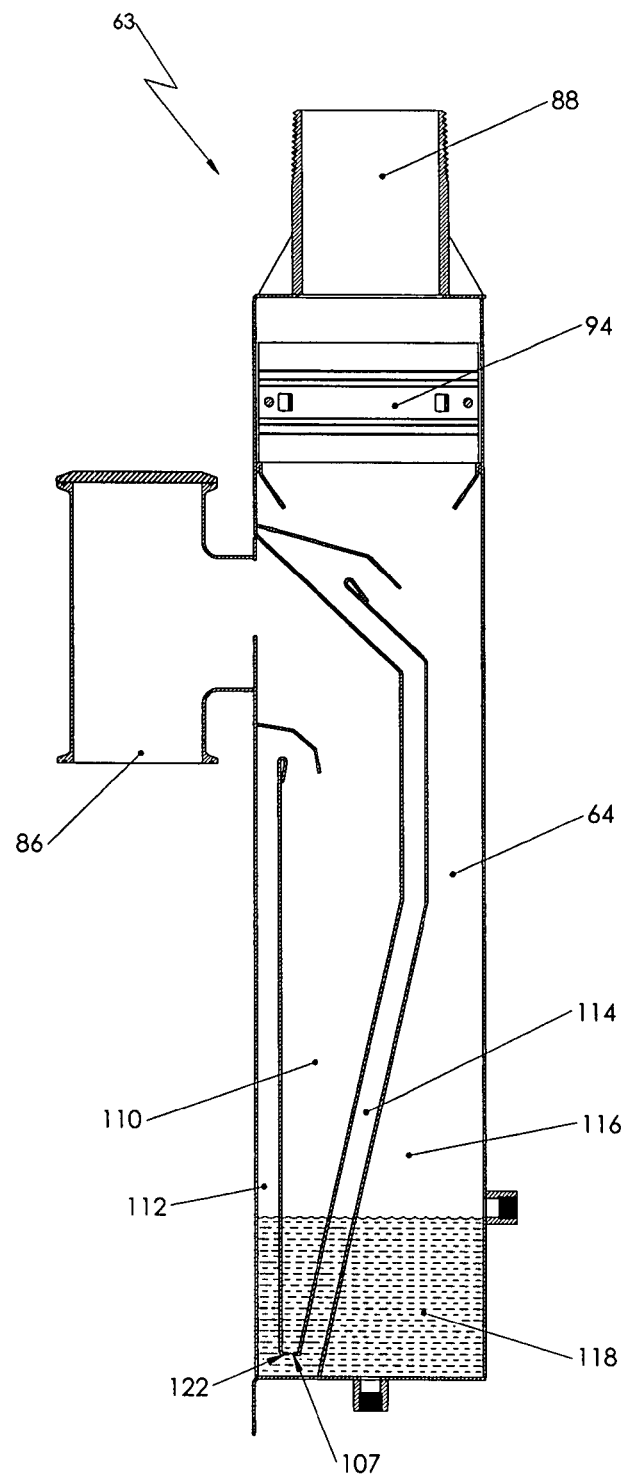
FIG. 9 is a cross sectional front view of the liquid filled pressure/vacuum valve of FIG. 5 at equilibrium.

As indicated above, the liquid filled pressure/vacuum valve 63 acts as a regulator of air flow between the atmosphere 46 and the UST 14. FIG. 9 is a cross section of the interior of the body 64 illustrating the liquid filled pressure/vacuum valve 63 at equilibrium. The fluid 118 is distributed equally between all passages 110, 112, 114, 116.

The fluid 118 levels in the liquid filled pressure/vacuum valve 63 can be monitored and increased using a test plug port 42 and opening a fill port 44. The fluid 118 can be any fluid that is suitable for venting out air when a particular level of air pressure is applied. The fluid must have a low vapor pressure to prevent evaporation and be hydrophilic. Preferred fluids 118 are propylene glycol or ethylene glycol. The fluid must also have a low freezing point. Other preferred fluid characteristics are fuel phobic, non-reactive, non-foaming and low toxicity. Each of these characteristics contributes to improved performance of the liquid filled pressure/vacuum valve 10, 63. A non-foaming characteristic is particularly important as foam will impede the response time of the system as well as modify the differential pressure settings of the system.

Figure 10:
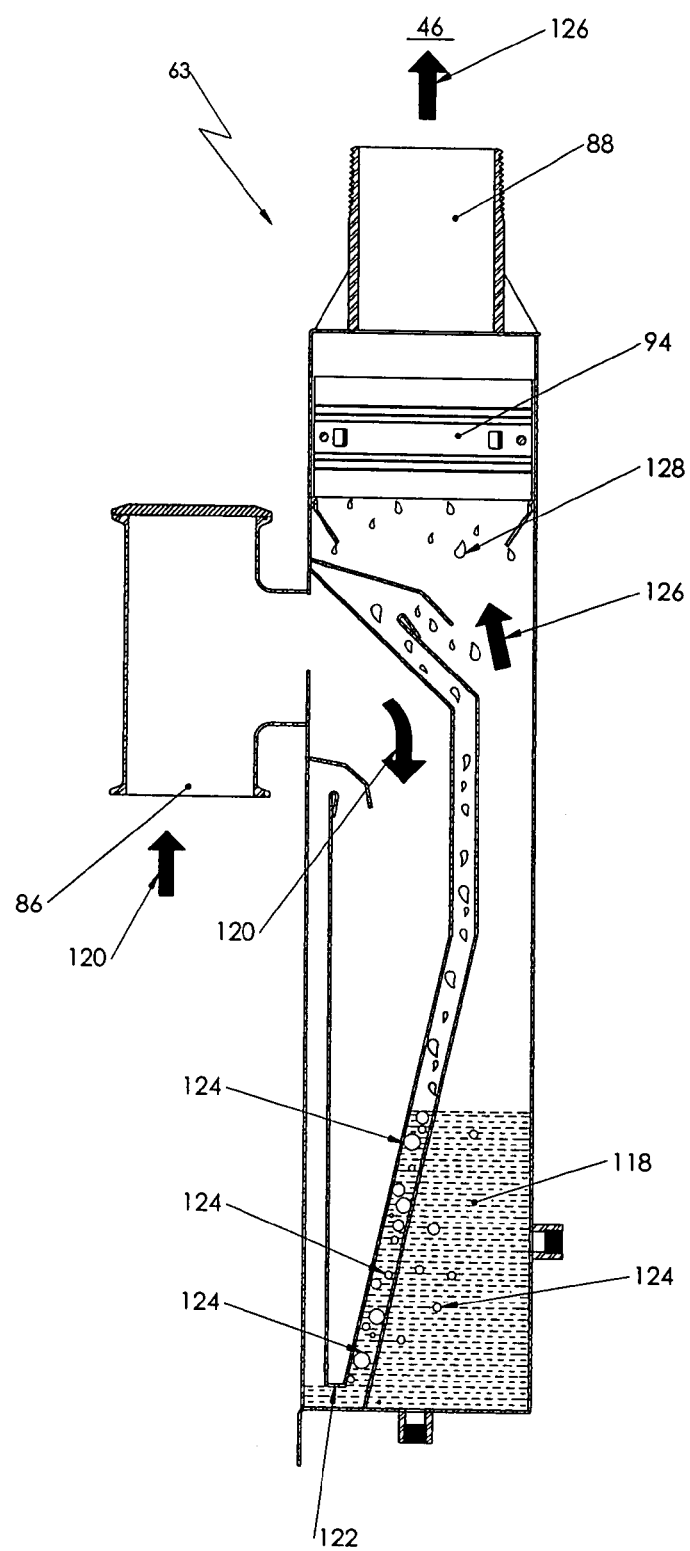
FIG. 10 is a cross sectional front view of the liquid filled pressure/vacuum valve of FIG. 5 illustrating a situation where the pressure in the underground storage tank is greater than atmospheric pressure.

Referring now to FIG. 10, a cross sectional front view of the liquid filled pressure/vacuum valve 63 illustrates a situation where the pressure in the UST is greater than atmospheric pressure by at least the minimum operation differential pressure setting. When the pressure within the UST 14 is greater than the atmospheric pressure (illustrated by arrow 120), the increased force of this pressure differential is directed into a suction zone (i.e., first wide flow passage 110 and first narrow flow passage 112) through to a pressure zone (i.e., second narrow flow passage 114 and second wide flow passage 116). When this force acting on the suction zone is sufficiently strong, the fluid 118 in the suction zone is forced from the first wide flow passage 110 to the first narrow flow passage 112 through opening 107 towards the juncture 122 with the second narrow flow passage 114. When the fluid 118 in the suction zone reaches the vacuum limit, the fluid 118 is forced below the juncture 122 and ullage vapor 124 begins to bubble through the fluid 118 that has been forced into the second narrow flow passage 114 and the second wide flow passage 116. With increasing flow rate, the ullage vapor 124 will preferentially displace the fluid 118 from the second narrow flow passage 114 into the second wide flow passage 116. Consequently, the ullage vapor 124 will be forced through the pressure zone to the separator 94 and eventually through the outlet 88 to the atmosphere 46 (illustrated by arrow 126). The moist ullage vapor 124 and fluid 118 bubbling through the fluid 118 will collect on the separator 94 impeding exit of the fluid 118 from the body 64. The moisture/fluid 118 will then collect on the separator 94 and return via droplets 128 of fluid 118 to the interior 82.

Figure 11:
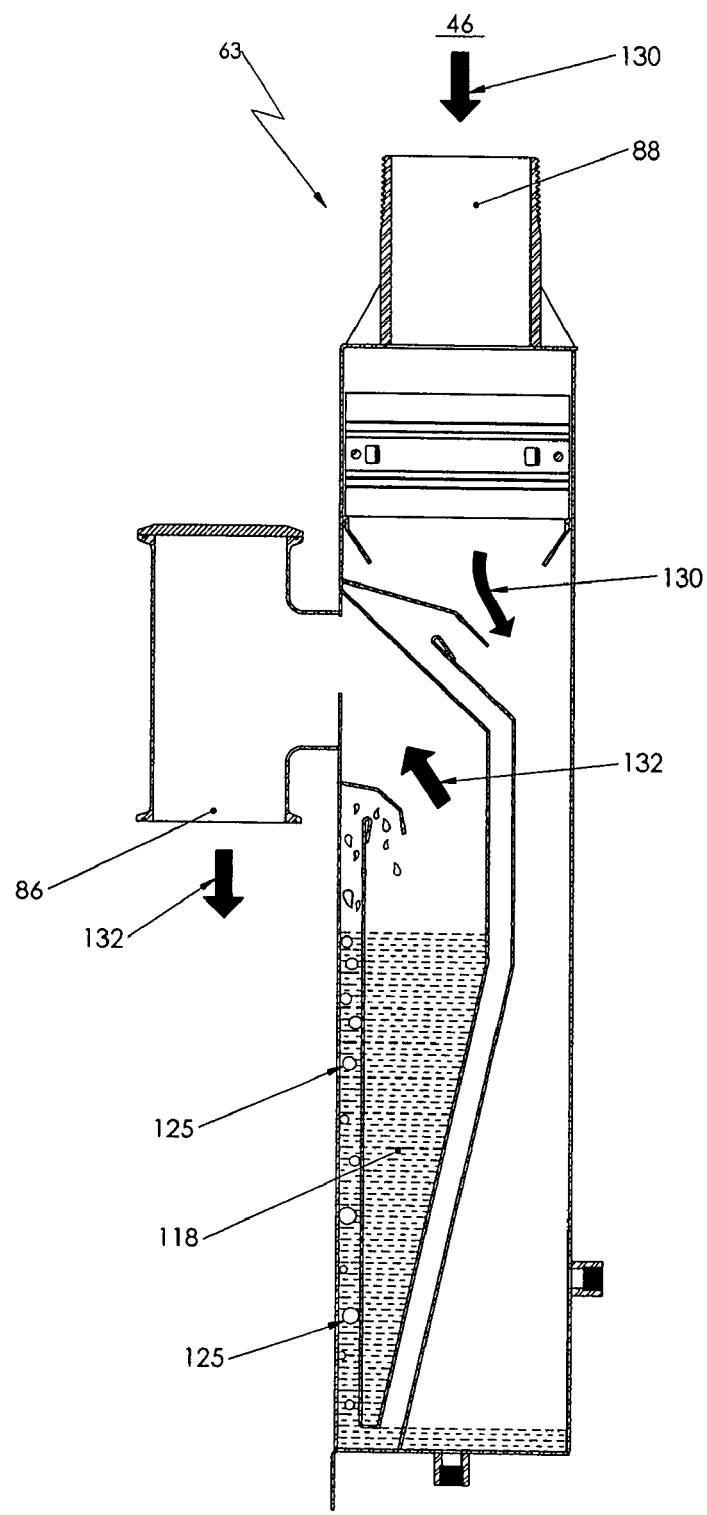
FIG. 11 is a cross sectional front view of the liquid filled pressure/vacuum valve of FIG. 5 illustrating a situation where the atmospheric pressure is greater than the underground storage tank pressure.

Referring now to FIG. 11, a cross sectional front view of the liquid filled pressure/vacuum valve 63 illustrates a situation where the atmospheric pressure is greater than the UST pressure by at least the minimum operational differential pressure setting. When the atmospheric pressure is greater than the pressure within the UST 14 (illustrated by arrow 130), the increased force due to the pressure differential is directed onto the pressure zone (i.e., second narrow flow passage 114 and second wide flow passage 116) through to the suction zone (i.e., first wide flow passage 110 and first narrow flow passage 112). When this downward force acting on the pressure zone is sufficiently strong, the fluid 118 in the pressure zone is forced towards the suction zone. When the fluid 118 in the pressure zone reaches the vacuum limit, the fluid 118 is forced below the juncture 122 and air 61 begins to bubble through the fluid 118 that has been forced into the suction zone. Due to the geometry, the air 61 will preferentially exit through the first narrow flow passage 112, displacing the bulk of the fluid 118 into the first wide flow passage 110. Consequently, the air 125 will be forced through the suction zone and the vent pipe 12, and into the UST 14 (illustrated by arrow 132). The fluid 118 that is ejected toward the inlet 86 generally will not reach the inlet due to low velocities of air flow in this flow direction. The small amount of fluid 118 that does reach the inlet 86 cannot run into the vent pipe 12 due to a raised lip on the inlet 86.

Figure 12:
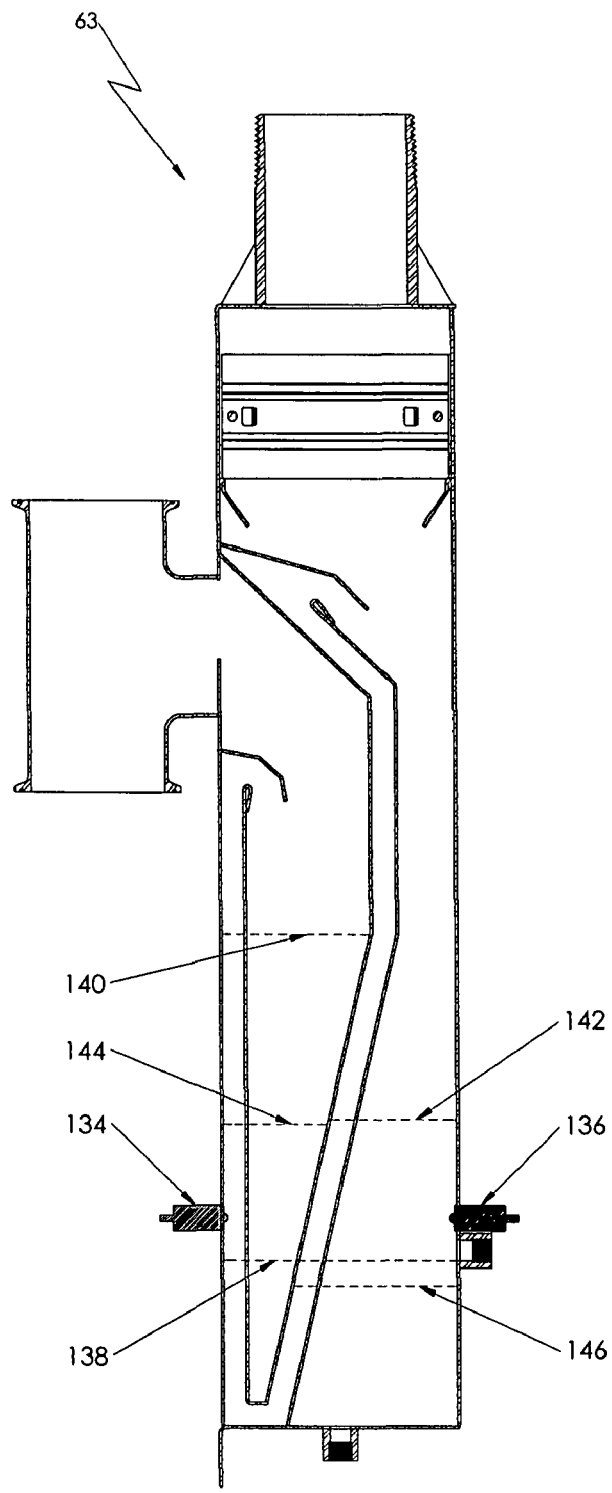
FIG. 12 is a cross sectional front view of the liquid filled pressure/vacuum valve of FIG. 5 having sensors utilized for testing the liquid filled pressure/vacuum valve.

Referring now to FIG. 12, at least one sensor 134 can be coupled to the liquid filled pressure/vacuum valve 63 for monitoring. Although two sensors 134, 136 are illustrated, any number of sensors is contemplated. The sensor 134 can be utilized to determine whether there is enough, too much, or just enough fluid 118 applied to the liquid filled pressure/vacuum valve 63. The sensor 134 can be located at or above the equilibrium level 138 of the fluid 118 (i.e., the normal operating fill setting). By positioning the sensor 134 in the suction zone (i.e., first wide flow passage 110 and first narrow flow passage 112) the amount of fluid 118 can be monitored when there is increased force due to the pressure differential. In this circumstance, the fluid 118 would rise to a selected suction set point 140 (i.e., maximum 10 inches WC). Likewise, by positioning the sensor 136 in the pressure zone (i.e., second narrow flow passage 114 and second wide flow passage 116) the fluid 118 can be monitored when there is increased force due to the pressure differential. In this circumstance, the fluid 118 would rise to a selected pressure set point 142 (i.e., maximum 6 inches WC). If upon a circumstance when both sensors are sensing fluid 118 levels at the same time, a high fluid alarm (not illustrated) would activate. Likewise, if upon a circumstance when neither of the sensors 134, 136 are sensing fluid 118, a low fluid alarm (not shown) would be activated. In determining whether the alarms would be activated, an algorithm can be utilized to calculate the fluid 118 levels and the necessary time delay between measuring the data points in order to allow the fluid 118 to reflect the current differential pressure. Each liquid filled pressure/vacuum valve 10, 63 is electrically coupled to a computer monitoring system for on-site and/or remote monitoring of the activity within the liquid filled pressure/vacuum valve 10, 63.

Figure 13:
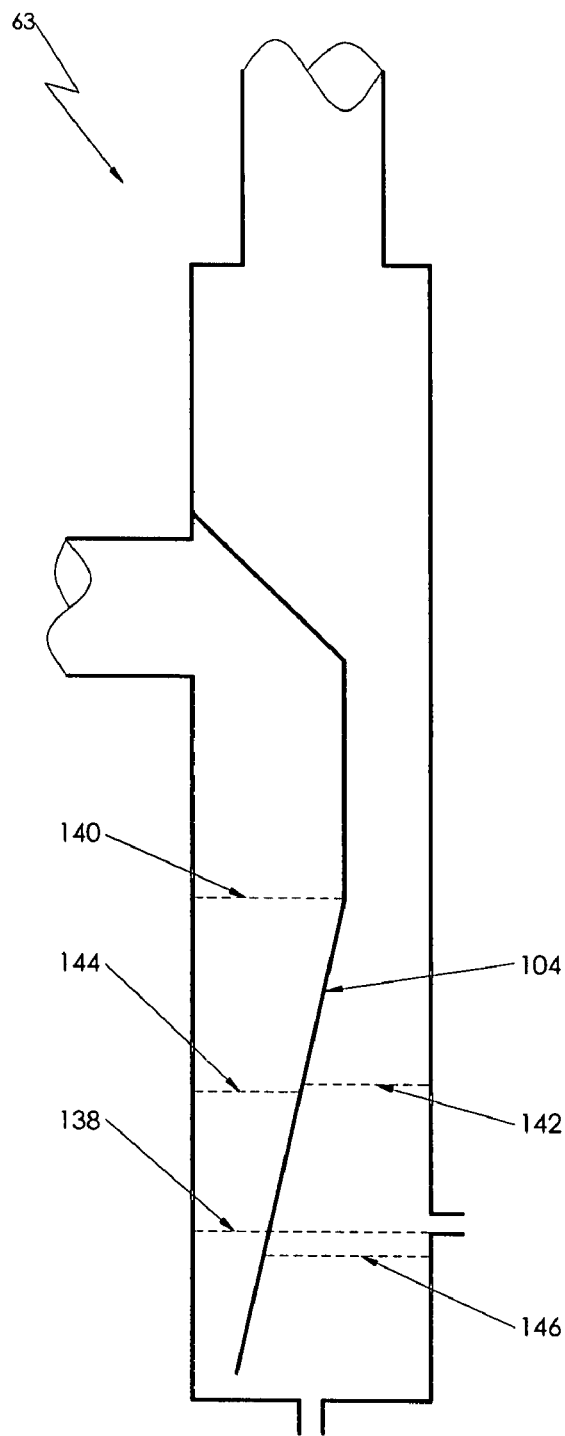
FIG. 13 is a cross sectional front view of another exemplary liquid filled pressure/vacuum valve.
Figure 14:
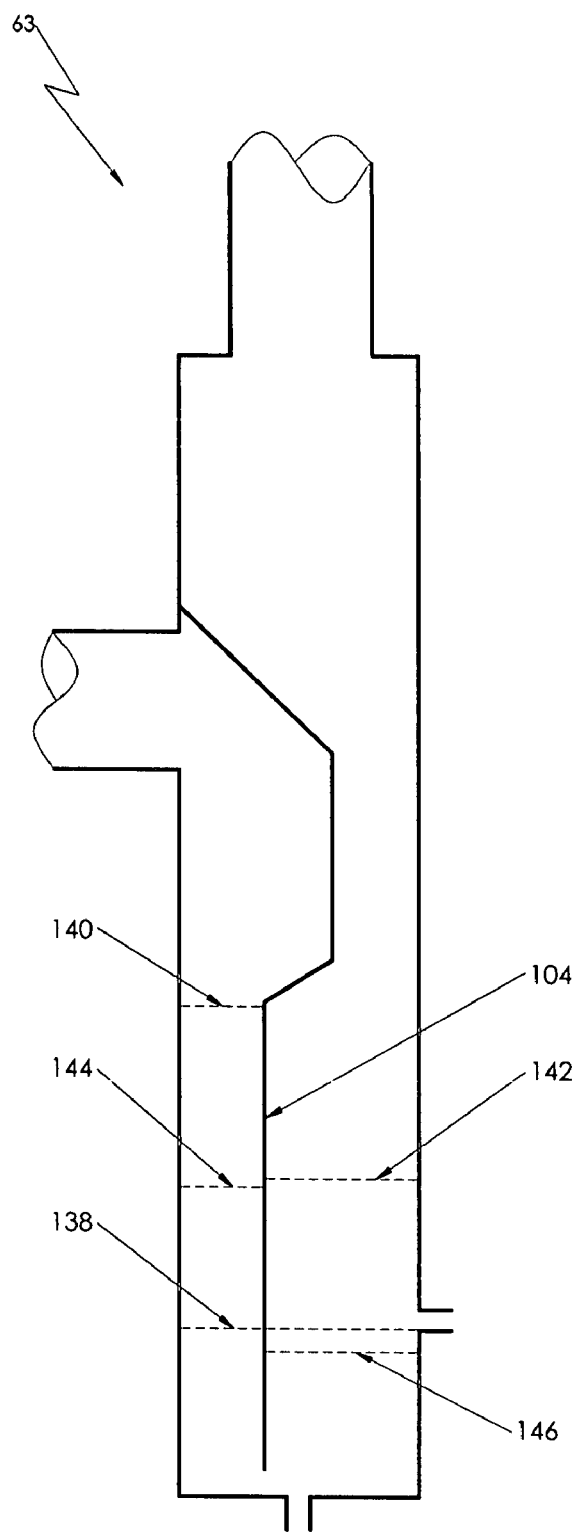
FIG. 14 is a cross sectional front view of another exemplary liquid filled pressure/vacuum valve.

Referring now to FIGS. 13 and 14, a cross sectional front view of other exemplary geometries of the baffle 104 in the liquid filled pressure/vacuum valve 63 are presented. FIGS. 13 and 14 illustrate the use of a baffle 104 that is appropriately designed to achieve the desired operational settings. The baffle 104 of FIG. 13 is disposed in the interior 82 of the liquid filled pressure/vacuum valve 63 such that a top portion is coupled above the inlet 86, extends towards the center and angles toward the bottom 76 of the liquid filled pressure/vacuum valve 63. The position and geometry of the baffle 104 facilitates the liquid filled pressure/vacuum valve 63 to maintain the operational settings. The baffle 104 of FIG. 14 is disposed in the interior 82 of the liquid filled pressure/vacuum valve 63 such that a top portion is coupled above the inlet 86, extends towards the center and further extends vertically toward the bottom 76 of the liquid filled pressure/vacuum valve 63. In this design, the position and geometry of the baffle 104 facilitates the liquid filled pressure/vacuum valve 63 to maintain the operational settings.

As described above, the geometry of the baffles 104, 106 maintains the desired operational settings for the liquid filled pressure/vacuum valve 63. FIGS. 12, 13, and 14 also illustrate the desired range of operational settings. For the suction (or vacuum) zone, the preferred minimum setting is about 6 inches WC vacuum 144 and the preferred maximum setting is about 10 inches WC vacuum 140. For the pressure zone, the preferred minimum setting is about 2.5 inches WC vacuum 146 and a preferred maximum setting is about 6 inches WC pressure 142. Adjusting the angle of the baffles can modify the operational settings for the liquid filled pressure/vacuum valve 63. By properly choosing the appropriate geometry of the baffles, a range of differential pressure settings can be met despite fluctuations of fluid volume.

The advantage of the liquid filled pressure/vacuum valve 10, 63 include there are not moving parts so the maintenance costs are low. The liquid filled pressure/vacuum valve 10, 63 is easily maintained, allowing the user to periodically test the unit for appropriate liquid levels. The location of the fill port and drain allow the user to easily adjust the levels of fluid. Further, the liquid filled pressure/vacuum valve 10, 63 provides a means for maintaining the UST system within the desired operational settings of 8 inches WC vacuum and 3 inches WC pressure. The liquid nature of the seal employed to keep the ullage vapors separate from the atmosphere will not degrade with time or use so long as liquid levels are checked and maintained at regular intervals. Also, the liquid seal does not require any external inputs to open or close, which indicates that regular operating costs are negligible.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. Therefore, it is intended that the disclosure not be limited to the particular embodiment disclosed as the best mode contemplated for carrying out this disclosure.

What is claimed is:

1. A liquid filled pressure/vacuum valve comprising:
   a body having an inlet and an outlet coupleable to atmosphere;
   a suction zone disposed in said body and fluidly coupled to said inlet;
   a pressure zone disposed in said body and fluidly coupled to said outlet, said pressure zone in fluid communication with said suction zone; and
   a fluid disposed in said body and configured to flow between said suction zone and said pressure zone, said flow of said fluid is determined by an increased force due to a pressure differential between said suction zone and said pressure zone, wherein said suction zone has a first wide flow passage fluidly coupled to a first narrow flow passage such that the fluid will flow from said first narrow flow passage to said first wide flow passage when atmospheric pressure is greater than a pressure at said inlet; and said pressure zone has a second wide flow passage fluidly coupled to a second narrow flow passage, said second narrow flow passage in fluid communication with said first narrow flow passage, such that the fluid will flow from said second narrow flow passage to said second wide flow passage when atmospheric pressure is less than a pressure at said inlet, said suction zone and said pressure zone sized and configured so that a vacuum operational setting differs from a pressure operational setting, said vacuum operational setting is about 6 inches to about 10 inches water column vacuum and said pressure operational setting is about 2.5 inches to about 6 inches water column pressure.

2. The liquid filled pressure/vacuum valve of claim 1, wherein a separator is configured to prevent escape of said fluid to said atmosphere and to return said fluid to said pressure zone.

3. The liquid filled pressure/vacuum valve of claim 1, further comprising:
   a first baffle and a second flow direction shield positioned in said body to create said first wide flow passage and said first narrow flow passage in suction zone; and
   a second baffle and a first flow direction shield positioned in said body to create said second wide flow passage and said second narrow flow passage in pressure zone.

4. The liquid filled pressure/vacuum valve of claim 3, further comprising:
   at least one opening disposed in said first baffle and said second baffle.

5. The liquid filled pressure/vacuum valve of claim 3, wherein a geometry of said first baffle and said second baffle are configured to achieve said vacuum operational setting and said pressure operational setting.

6. The liquid filled pressure/vacuum valve of claim 1, further comprising:
   at least one baffle disposed in the liquid filled pressure/vacuum valve to create said suction zone and said pressure zone, said at least one baffle coupled to the liquid filled pressure/vacuum valve at a position above said inlet and extending toward a bottom of the liquid filled pressure/vacuum valve.

7. The liquid filled pressure/vacuum valve of claim 1, further comprising:
   a test plug port disposed in said inlet.

8. The liquid filled pressure/vacuum valve of claim 1, further comprising:
   a first sensor disposed in said suction zone; and
   a second sensor disposed in said pressure zone;
   wherein said first sensor and said second sensor are configured to monitor a level of said fluid.

9. The liquid filled pressure/vacuum valve of claim 1, further comprising:
   a fluid fill port and a fluid drain port disposed in said body.

10. The liquid filled pressure/vacuum valve of claim 1, wherein said fluid comprises one of propylene glycol and ethylene glycol.

11. The liquid filled pressure/vacuum valve of claim 1, further comprising:
    at least one flange disposed in said body proximate a separator.

12. A liquid filled pressure/vacuum valve, comprising:
    a body having an inlet and an outlet coupleable to atmosphere;
    a suction zone disposed in said body and fluidly coupled to said inlet;
    a pressure zone disposed in said body and fluidly coupled to said outlet, said pressure zone in fluid communication with said suction zone;
    a fluid disposed in said body and configured to flow between said suction zone and said pressure zone, said flow of said fluid is determined by an increased force due to a pressure differential between said suction zone and said pressure zone; and
    at least one baffle disposed in the liquid filled pressure/vacuum valve to create said suction zone and said pressure zone, said at least one baffle coupled to the liquid filled pressure/vacuum valve at a position above said inlet and extending toward a bottom of the liquid filled pressure/vacuum valve wherein said at least one baffle has a variable geometry to achieve a desired operational setting of about 6 inches to about 10 inches water column vacuum and about 2.5 inches to about 6 inches water column pressure for the liquid filled pressure/vacuum valve.

13. The liquid filled pressure/vacuum valve of claim 12, wherein said at least one baffle is configured to create a first wide flow passage and a first narrow flow passage in said suction zone, and a second wide flow passage and a second narrow flow passage in said pressure zone.

14. The liquid filled pressure/vacuum valve of claim 13, wherein said first narrow flow passage is physically and fluidly coupled to said second narrow flow passage.

15. The liquid filled pressure/vacuum valve of claim 12, further comprising a flow direction shield coupled to said body at a position below said inlet.

16. The liquid filled pressure/vacuum valve of claim 12, further comprising at least one opening disposed in said at least one baffle.

17. The liquid filled pressure/vacuum valve of claim 12, further comprising a test plug port disposed in said inlet.

18. The liquid filled pressure/vacuum valve of claim 12, further comprising:

a first sensor disposed in said suction zone; and
a second sensor disposed in said pressure zone, wherein said first sensor and said second sensor are configured to monitor a level of said fluid.

19. The liquid filled pressure/vacuum valve of claim 12, further comprising:
a fluid fill port and a fluid drain port disposed in said body.

20. The liquid filled pressure/vacuum valve of claim 12, wherein said fluid comprises one of propylene glycol and ethylene glycol.

21. The liquid filled pressure/vacuum valve of claim 12, further comprising:
a separator coupled to said body proximate said outlet, said separator configured to prevent escape of said fluid to said atmosphere and to return said fluid to said second wide flow passage; and
at least one flange disposed in said body proximate said separator.

22. A liquid filled pressure/vacuum valve, comprising:
a body having an inlet and an outlet coupleable to atmosphere, said body having an interior opposite an exterior and a top opposite a bottom;
a first baffle coupled to said body at a position above said inlet, said first baffle configured to create a first wide flow passage and a first narrow flow passage;
a second flow direction shield physically coupled to said body at a position below said inlet, said second flow direction shield defining a portion of said first narrow flow passage;
a second baffle physically coupled to said bottom of said body, said second baffle configured to create a second wide flow passage and a second narrow flow passage, said second narrow passage is defined by said first baffle and said second baffle;
a first flow direction shield coupled to said body at a position above said first baffle, said first flow direction shield defining a portion of said second narrow flow passage;
a fluid disposed in said bottom of said body, said fluid configured to flow between said first wide flow passage, said first narrow flow passage, said second wide flow passage, and said second narrow flow passage, said flow of said fluid is determined by an increased force due to a pressure differential between said first wide flow passage and said first narrow flow passage and said second wide flow passage and said second narrow flow passage.

23. The liquid filled pressure/vacuum valve of claim 22, wherein said first narrow flow passage is physically and fluidly coupled to said second narrow flow passage.

24. The liquid filled pressure/vacuum valve of claim 22, further comprising:
at least one opening disposed in said first baffle and in said second baffle.

25. The liquid filled pressure/vacuum valve of claim 22, further comprising:
a test plug port disposed in said inlet.

26. The liquid filled pressure/vacuum valve of claim 22, further comprising:
a first sensor disposed in said suction zone; and
a second sensor disposed in said pressure zone;
wherein said first sensor and said second sensor are configured to monitor a level of said fluid.

27. The liquid filled pressure/vacuum valve of claim 22, further comprising:
a fluid fill port and a fluid drain port disposed in said body.

28. The liquid filled pressure/vacuum valve of claim 22, wherein said fluid comprises one of propylene glycol and ethylene glycol.

29. The liquid filled pressure/vacuum valve of claim 22, further comprising:
a separator coupled to said body proximate said outlet, said separator configured to prevent escape of said fluid to said atmosphere and to return said fluid to said second wide flow passage; and
at least one flange disposed in said body proximate said separator.

30. The liquid filled pressure/vacuum valve of claim 22, wherein a geometry of said first baffle and said second baffle are configured to achieve a desired operational setting for the liquid filled pressure/vacuum valve of about 6 inches to about 10 inches water column vacuum and about 2.5 inches to about 6 inches water column pressure.

31. A liquid filled pressure/vacuum valve, comprising:
a suction zone having an inlet, said suction zone including said inlet, an upper chamber and a suction zone chamber, said upper chamber enlarged relative to said suction zone chamber, said upper chamber is in fluid communication with said suction zone chamber;
a pressure zone having an outlet fluidly coupleable to atmosphere and including said outlet, a lower chamber, and a pressure zone chamber, said lower chamber enlarged relative to said pressure zone chamber, said lower chamber is in fluid communication with said pressure zone chamber, and said pressure zone chamber is in fluid communication with said suction zone chamber; and
a fluid disposed in and configured to flow between said suction zone and said pressure zone, said flow of said fluid is determined by an increased force due to a pressure differential between said suction zone and said pressure zone, such that the fluid will flow from said suction zone chamber to said upper chamber when atmospheric pressure is greater than a pressure at said inlet, and the fluid will flow from said pressure zone chamber to said lower chamber when atmospheric pressure is less than a pressure at said inlet and such that the fluid will flow from said suction zone chamber to said pressure zone chamber when atmospheric pressure is less than the pressure at said inlet, said suction zone and said pressure zone sized and configured so that a vacuum operational setting differs from a pressure operational setting, said vacuum operational setting is about 6 inches to about 10 inches water column vacuum and said pressure operational setting is about 2.5 inches to about 6 inches water column pressure.

32. The liquid filled pressure/vacuum valve of claim 31, further comprising:
at least one fluid fill port disposed in said lower chamber; and
at least one fluid drain port disposed in said pressure zone chamber.

33. The liquid filled pressure/vacuum valve of claim 31, wherein said fluid comprises one of propylene glycol and ethylene glycol.

34. The liquid filled pressure/vacuum valve of claim 31, wherein a desired operational setting for the liquid filled pressure/vacuum valve is about 8 inches water column vacuum and about 3 inches water column pressure.

* * * * *